United States Patent [19]

Clark

[11] 4,340,310

[45] Jul. 20, 1982

[54] CONTROL MECHANISM FOR A GRAIN BIN STIRRING APPARATUS

[76] Inventor: Donald Y. Clark, R.R. #1, Central City, Nebr. 68826

[21] Appl. No.: 294,270

[22] Filed: Aug. 19, 1981

[51] Int. Cl.³ .............................. B01F 7/24; B01F 7/30
[52] U.S. Cl. ................................. 366/261; 200/52 R; 200/80 A; 366/287; 366/601
[58] Field of Search ................. 366/83, 261, 287, 292, 366/297, 318, 601, 288, 281–284; 200/52 R, 61.2, 61.21, 61.47, 61.48, 80 A, 85 R

[56] References Cited

U.S. PATENT DOCUMENTS

| | | | |
|---|---|---|---|
| 3,410,537 | 11/1968 | Fienhold | 366/261 |
| 3,445,091 | 5/1969 | Jackson | 366/261 |
| 3,584,842 | 6/1971 | Sukup | 366/261 |
| 3,776,512 | 12/1973 | McKinnon | 366/261 |
| 4,162,857 | 7/1979 | Spurling | 366/261 |
| 4,248,538 | 2/1981 | Sukup | 366/261 |
| 4,274,750 | 6/1981 | Smit | 366/261 |

*Primary Examiner*—Philip R. Coe
*Assistant Examiner*—Timothy F. Simone

[57] ABSTRACT

A control mechanism which includes a mercury switch associated with each down auger carried by an arcuately rotating horizontal support of a grain bin stirring apparatus which does not permit the arcuate movement to commence until a predetermined rate of auger revolution is reached and which also automatically terminates said arcuate movement whenever the structure to which the augur is journaled is tipped beyond a predetermined angle.

8 Claims, 9 Drawing Figures

4,340,310

CONTROL MECHANISM FOR A GRAIN BIN STIRRING APPARATUS

BACKGROUND OF THE INVENTION

The present invention relates generally to control devices for grain bin stirring apparatuses having down augers carried upon a support member which rotates horizontally about the grain bin for arcuate movement thereabout of said augers. More particularly a control mechanism is disclosed which does not permit the arcuate movement to commence until a predetermined rate of revolution of an auger associated with said switch is reached and which also automatically terminates the arcuate movement whenever the structure to which the associated auger is journaled is, for any reason, tipped beyond a predetermined angle.

Typical of the type of grain bin stirring apparatuses with which the present invention functions, are those revealed in U.S. Pat. No. 3,584,842 to Sukup and U.S. Pat. No. 4,162,857 to Spurling. These patents are representative of two basic styles of down auger grain bin stirring apparatuses. The Sukup patent discloses an apparatus which includes a wheeled carriage which moves radially and reciprocally with respect to a circular grain bin, upon its horizontal support member, whereas, Spurling disclosed down augers which are journaled directly to the horizontal support member and therefore, only move in a circular fashion about the bin. In both of these apparatuses a motor separate from that or those which drive the down augers is responsible for the arcuate movement of the horizontal support member, and it is that motor which is controlled by the present invention. In an apparatus employing a single source of motive power for both down auger rotation and the horizontal support member arcuate movement, the concept of the present invention could be employed with the addition of a solenoid controlled release clutch for the drive responsible for the arcuate movement or in some other known manner.

While grain bin stirring apparatuses of various designs have proven their viability, they are commonly subject to breakdown relating to the operation of their down augers as a result of down auger motor failure, pulley belt failure, and overloading due to wet grain conditions. As the augers travel around the bin, there will be some unavoidable trailing of the lower portion of the auger. However, when the augers veer too far from the perpendicular, due to one or more of these conditions, the force required to move the horizontal support member around the bin becomes magnified, and the chances for structural failure are increased.

Typically, in these apparatuses the horizontal support member is supported at the periphery of a circular grain bin by an end wheel running on a peripheral track and at the center by chains or rods hanging from the roof of the bin and supporting a swivel joint. Excessive deflection from the vertical of the down augers will set up forces tending to move the horizontal support member past the center of the grain bin and thereby causing the end wheel to jump the track. Some of the various methods in the prior art of stopping the arcuate movement of the horizontal support member in the event of such breakdown include an electronic sensor on the two ends of the end wheel drive, a switch on the center support structure sensitive to the movement of the horizontal support member in an upward direction, a mercury switch on the horizontal support member itself, and an on-off sail switch which energizes the motor driving the end wheel as a result of the spinning action of each auger.

In grain bin stirring apparatuses of the type which this invention is concerned, less force to initiate the arcuate movement of the horizontal support member is required if the rotation of the down augers has first commenced. Furthermore, the higher the rate of revolution of the down augers before initiating the arcuate movement of the horizontal support member about the grain bin, the easier it will be for the motor driving them arcuately through the grain mass to overcome its resistance. As a result, there will be less wear and tear and longer life of the associated parts if the arcuate movement is automatically delayed until the auger rotation first reaches a predetermined rate.

Of the aforementioned control devices, the sail switch is the only one which bases control of the arcuate movement of the horizontal support member on a predetermined rate of revolution of the augers. However, this device is complex, having many moving parts which are easily subject to breakdown themselves. These parts include a spring operated switch, a circular cover plate to hold the switch in the down, off position when the auger is not revolving at a sufficient rate, and a plurality of steel balls attached to arms which are again pivotally attached to the auger shaft. Many of these parts are themselves subject to breakdown or failure due to accumulated grime and dust or bending.

SUMMARY OF THE INVENTION

In the present invention, a mercury switch is provided for at least one down auger and preferably for each down auger supported by the horizontal support member, each of said switches being connected in series with the power supply to the motor which is responsible for the arcuate travel of the horizontal support beam about the grain bin. A carrier for the switch is hingedly attached at one end to a superstructure which is attached to the structure to which the associated auger is journaled at a location such that the other end of the carrier will extend past the center of the auger pulley. The free end of the carrier then rests upon the upper end of a link which is vertically slidable within a guide affixed to the superstructure and the lower end of the link rests upon canted ends of weights which are slidably and radially mounted atop the pulley, each positioned equidistantly and oppositely from the center thereof.

Along each side of both weights, a tension spring is connected between their ends distal to each other. Once the auger energizing motor is switched on, centrifugal force overcomes the tension springs, causing the weights to move radially outward, thereby lowering the link vertically along with the carrier and its mercury switch. Thus, the angle to the horizontal of the mercury switch at which current is allowed to flow through the end wheel energizing motor is a function of the rate of revolution of its associated auger. The relative dimensions and weights of the significant elements of the device will determine the auger revolution rate at which the end wheel commences turning.

In addition, as the augers travel about the grain bin, any of the aforementioned mishaps may cause an auger tip to begin trailing at a dangerous angle, one which may cause it to break. However, an excessive angle of tilt will be transmitted to the structure to which the auger itself is journaled, thereby tipping it far enough to tip the mercury switch away from the current completed attitude back to the attitude angled to the horizontal whereby the current will again be interrupted so long as the condition persists.

An object of the present invention is the provision of an improved control mechanism for the motor energizing the track wheel of a grain bin stirring device.

Another object is to provide a control mechanism which will respond to breakdown or failure associated with each down auger of a grain bin stirring apparatus.

A further object of the invention is the provision of a mechanism controlling the track wheel of a down auger grain bin stirring apparatus, which will temporarily stop the arcuate movement of the horizontal support member if any auger supported thereby slows down below a predetermined rate, or if it veers away from the vertical above a predetermined angle of tilt due to a temporary problem such as a supermoist grain condition, and then automatically discontinue the interruption after the temporary condition is no longer present.

Still another object is to provide a control mechanism for the motor energizing the track wheel of a grain bin stirring apparatus which will not allow the completion of the circuit to said motor until the rate of revolution of each down auger associated with said mechanism has reached a predetermined level.

A still further object of the present invention is the provision of a simpler, less expensive, more maintenance free automatic track wheel motor control mechanism which responds to the rate of revolution of each down auger.

Other objects, advantages and novel features of the present invention will become apparent from the following detailed description of the invention when considered in conjunction with the accompanying drawings.

DESCRIPTION OF THE PREFERRED EMBODIMENT

Figure 1:
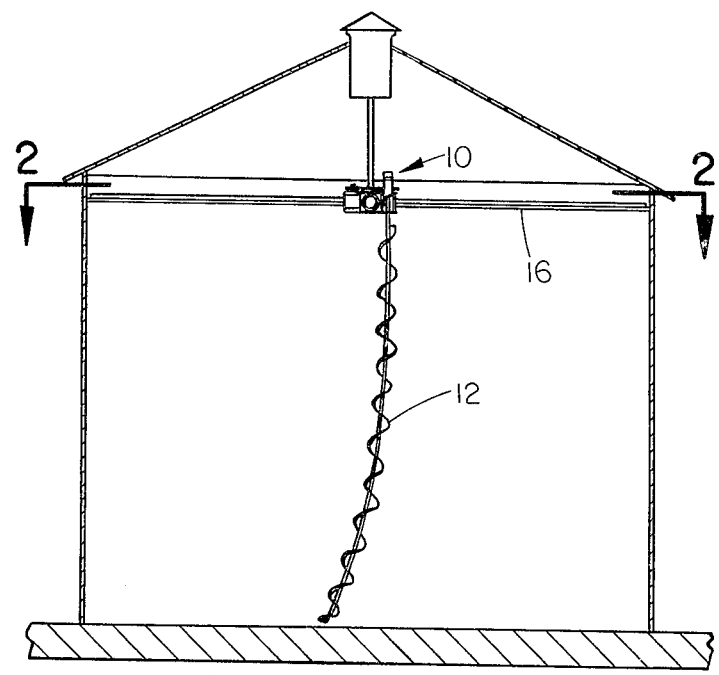
FIG. 1 is a section of a grain bin wherein the present invention is mounted for the control of the arcuate movement of down augers and the down augers are rotating at a rate which will cause rearward deflection of their tips, taken along line 1—1 of FIG. 2.
Figure 2:
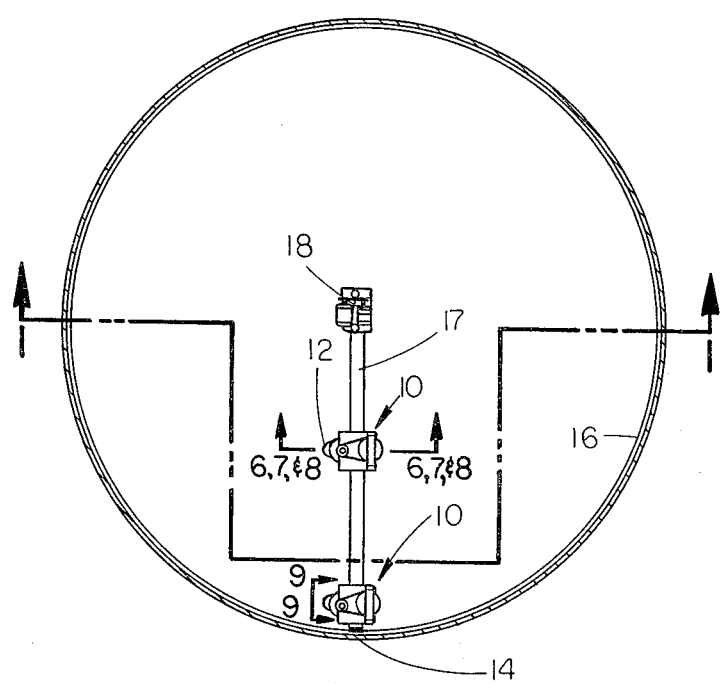
FIG. 2 is a section through the grain bin of FIG. 1 taken along line 2—2 of FIG. 1.
Figure 9:
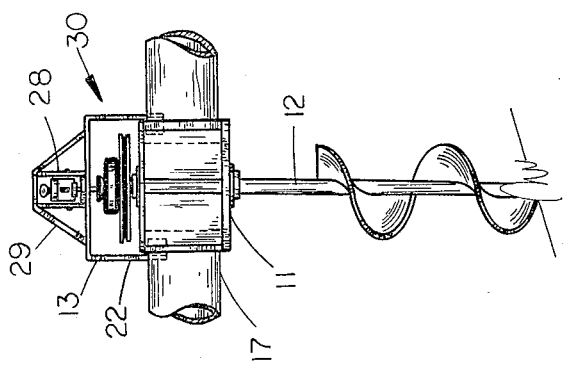

Referring now to the drawings wherein like reference numerals designate identical or corresponding parts throughout the several views, and more particularly to FIGS. 1 and 2 wherein a grain bin stirring apparatus of the type represented by U.S. Pat. No. 3,584,842 (see the Background Section) is disclosed, the control mechanism of this invention is shown mounted in association with each down auger and is designated generally at 10. In this particular grain bin and down auger arrangement a mounting plate 11 (see FIG. 9) has been fixedly attached to the structure to which down auger 12 is journaled, to provide for the affixation of superstructure 13 (see FIG. 9) thereto. In other arrangements, plate 11 may require a somewhat different configuration or be dispensed with entirely.

Referring again to FIG. 2, track wheel 14 revolves upon track 16 thereby causing the arcuate movement about the grain bin of the horizontal support member 17. Horizontal support member 17 also serves as a shaft which is coaxially connected at one end to the drive shaft of motor 18 and at its other end to the track wheel 14 (see FIG. 2). In other such apparatuses, the support member is hollow with the drive shaft inside of it. The grain bin stirring apparatus disclosed herein has two down augers, and therefore there will be two control mechanisms connected in series with motor 18. As a result, if either mechanism interrupts the current flowing to motor 18 when it is performing its job as intended, track wheel 14 will discontinue revolving, thus stopping the horizontal arcuate movement of the horizontal support member 17.

Figure 3:
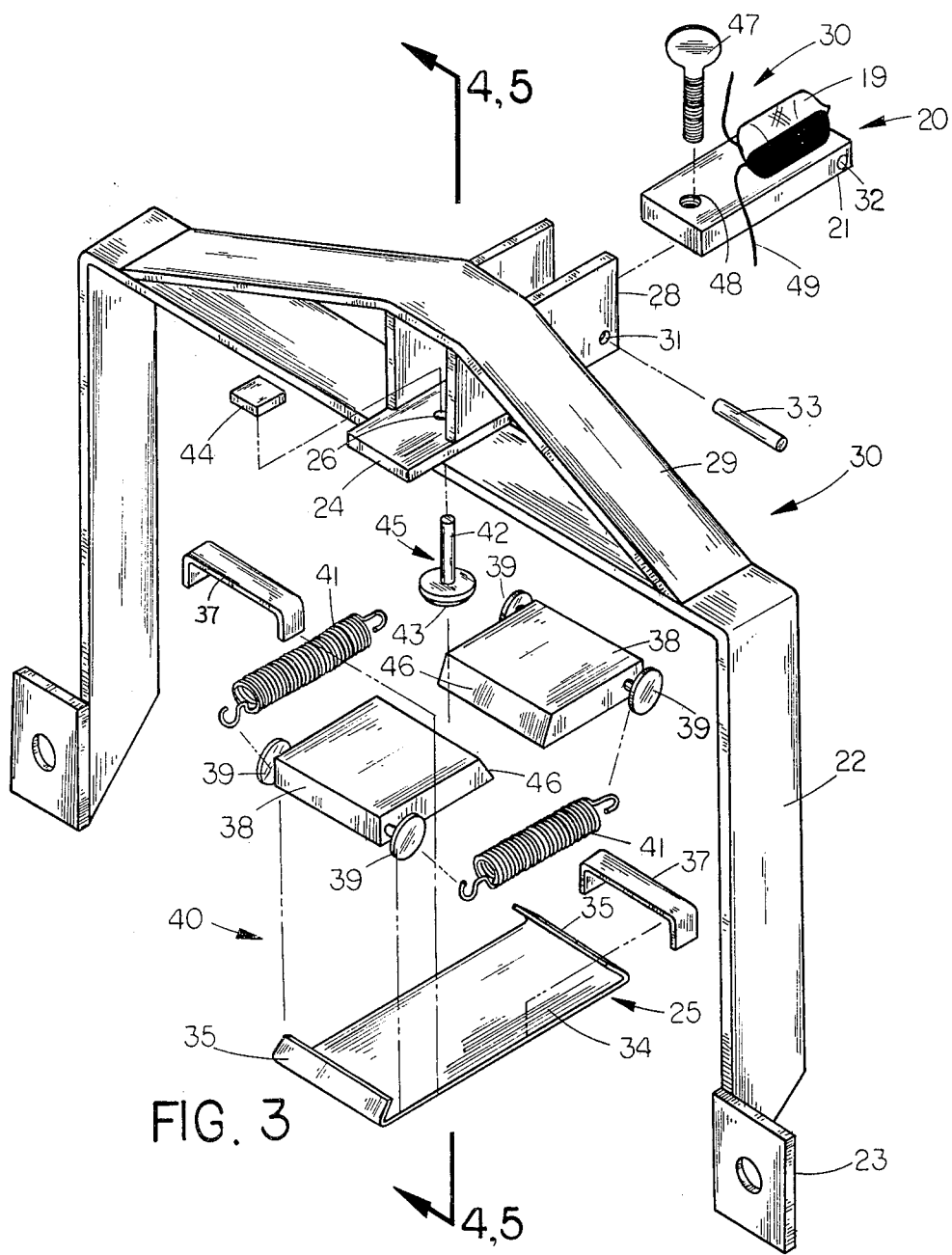
FIG. 3 is a rear exploded perspective view of the present invention not mounted.

Referring now to FIG. 3, mercury switch assembly 20 is comprised of mercury switch 19, switch carrier 21, adjustment screw 47, and electricity conductor 49. Mercury switch 19 is shown positioned atop switch carrier 21. Although no particular means for affixing switch 19 to carrier 21 is indicated in FIG. 3, it is contemplated that the same will be accomplished by any of several well known methods. The remainder of the description of switch assembly 20 follows in a later portion.

Superstructure 30 is shown in FIG. 3 to be comprised of an inverted U-shaped strap 22 having fixing tabs 23 mounted on the lower extremity of each leg for affixation to the upper end of mounting plate 11 (see FIG. 9) in a well known manner. Superstructure 30 is further comprised of an aperture plate 24 centrally mounted atop thereof and having an aperture 26 aligned with an aperture 27 of the same size centrally located through the horizontal member of inverted U-shaped member 22 (see also FIGS. 4 and 5), two vertical spaced apart plates 28 affixed atop aperture plate 24 and projecting frontwardly beyond U-shaped strap 22 to form a clevis for the pivotal attachment of carrier plate 21, and inverted shallow V-shaped strengthening member 29 connecting the horizontal portion of inverted U-shaped strap 22 near each depending leg with the clevis formed by aperture plate 24 and the two vertical plates 28.

The two vertical spaced apart plates 28 have coaligned apertures 31 in said projected portions thereof for the pivotal connection thereto of carrier 21, carrier 21 itself having a hole 32 of such diameter that pin 33 can serve as an axle therefor.

Figures 4, 5:
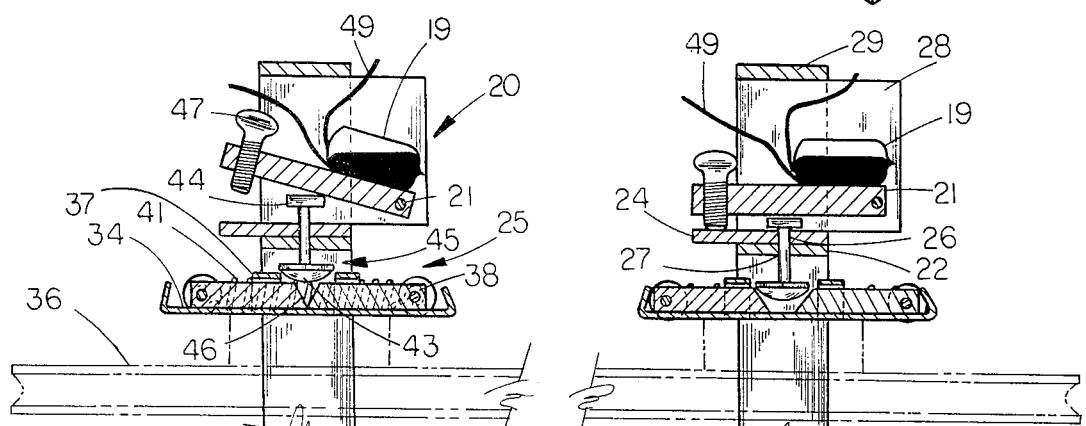
FIG. 4 is a cross-sectional view of the present invention along line 4—4 of FIG. 3 with the pulley and pulley hub shown in phantom lines and the switch in its preoperating interrupted attitude.
FIG. 5 is a cross-sectional view of the present invention taken along line 5—5 of FIG. 3 with the pulley and its hub shown in phantom lines and the switch in its completed circuit attitude.

As can best be seen in FIGS. 3, 4 and 5, weight assembly 40 is comprised of weight guide structure 25, two weights 38, four ear-shaped end tabs 39 and two tension springs 41. Referring now to FIG. 3, weight guide structure 25 is comprised of a base member 34, having turned up ends 35, which is fixedly mounted atop the pulley 36 of each down auger and two inverted U-shaped retaining straps 37 whose depending legs are secured to each of the two lower horizontal sides of member 34 in spaced-apart positions equidistant from the center thereof. Thus, member 34 and retaining straps 37 form two sleeves having dimensions which will slidably support the two weights 38 for radial movement with respect to pulley 36.

Each weight 38 has an upwardly sloped end 46 proximal the center of guide structure 34 as they are positioned therewithin. In addition, each weight 38 has two outwardly projecting ear-shaped end tabs 39 which are attached on either side distal ends 46. Two springs 41 then serve to bias the two weights 38 towards each other by having their end hooks slipped over the constricted portion of each pair of end tabs 39 along each co-planar side of the two weights 38. The width and position of retaining straps 37 with respect to its edge distal the center of guide structure 34 is such that end tabs 39 will not prevent the two weights 38 from coming together above the center of pulley 36. The edge of retaining straps 37 proximal the center of guide structure 34 must be sufficiently spaced away therefrom to allow link assembly 45 which will be hereinafter described to pass thereinbetween.

Finally, link assembly 45 provides the interaction between weight assembly 40 and mercury switch assembly 20. Link assembly 45 includes plunger member 42 which has a diameter slightly less than that of apertures 26 and 27 and is guided vertically by them; inverted, stub-nosed cap 43 coaxially attached thereto; and pad 44 affixed atop plunger 42 such that it will be above aperture plate 26. Thus cap 43 and pad 44, having horizontal dimensions larger than the diameter of apertures 26 and 27, retain plunger 42 therewithin. When the pulley is idle, cap 43 rests upon the upper edge of canted ends 46 of weights 38. Carrier 21, at about its center point rests upon pad 44. Adjustments thumb screw 47 threadably cooperates with threaded aperture 48 through the end of carrier 21 distal hole 32 for adjustably limiting the downwardly hinged position of carrier 21. This adjustment is made possible by the projection of the aperture plate 24 rearwardly of strap 22 so far as to be beneath threaded aperture 48 of carrier 21.

FIGS. 4 and 5 depict the two basic operating positions of the present invention. In FIG. 4, spring 41 is holding weights 38 in contact with each other at the lower edge of their canted ends 46. Link assembly 45 therefore is elevated and in turn has elevated mercury switch assembly 20 which prevents current in conductor 49 from flowing through motor 18. It should be appreciated that at some rate of revolution of pulley 36 weights 38 will move radially outward against the bias of springs 41. FIG. 5 depicts the extreme outward movement of weights 38 and their resulting affect upon the angle of mercury switch 19. That effect is that the current in circuit 49 is completed (see FIG. 5) and the track motor 18 will then commence turning track wheel 14 which causes the horizontal support member 17 to move about the grain bin on track 16.

Figure 8:
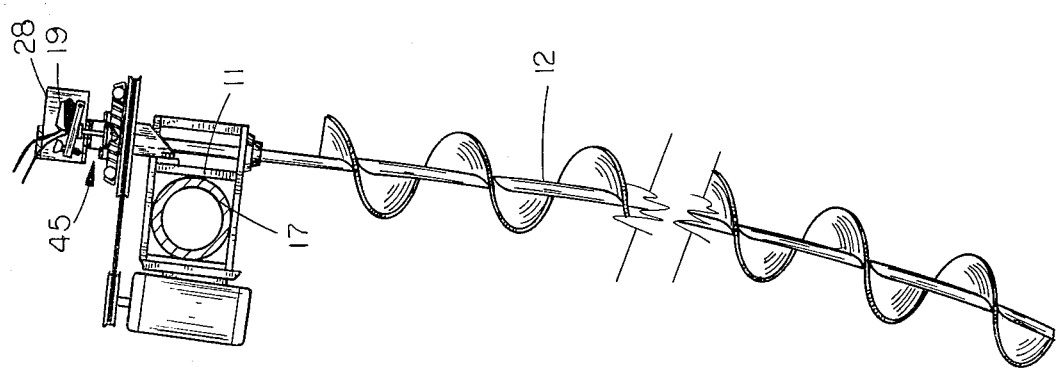
FIGS. 6, 7 and 8 are reduced cross-sectional views taken along lines 6—6, 7—7, and 8—8 of FIG. 2 showing the present invention and its associated auger; first, in an attitude wherein the current to the end wheel motor is interrupted due to a zero or low rate of revolution of the down auger; secondly, in an attitude wherein the current to the end wheel is complete due to the rate of revolution of the down auger having exceeded a predetermined rate; and, thirdly, in an attitude wherein the current to the end wheel is interrupted due to the excessive tilt of the down auger as a result of failure or breakdown; respectively; and, FIG. 9 is a reduced cross-sectional front view of the present invention taken along line 9—9 of FIG. 2 showing the invention assembled and mounted to an associated down auger.
Figure 7:
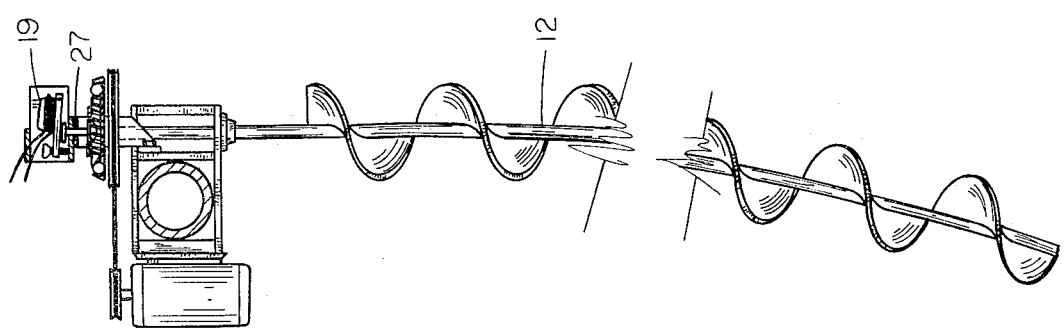
Figure 6:
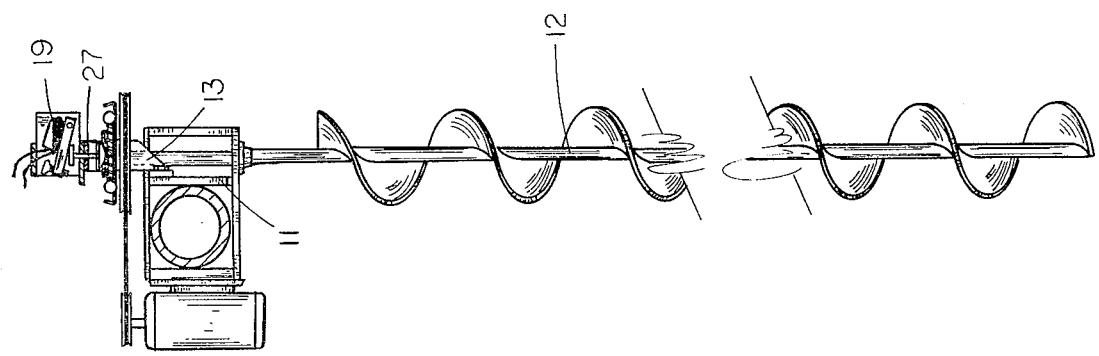

Referring now to FIGS. 6 and 7, the relative flexing rearwardly of auger 12 as seen in FIG. 7 associated with the attitude of the mercury switch 19 in FIG. 5 may be appreciated. FIG. 6 reflects the relation between the attitude of the mercury switch 19 as seen in FIG. 4, wherein mercury switch 19 is deeply angled with respect to the horizontal and, thus, is interrupting the current through circuit 49 and the weights 38 are inwardly oriented. In FIG. 8, the auger is seen to have developed further flex, so much that the support structure to which it is journaled itself has twisted away from the horizontal. This condition can be the result of excessive moisture in the corn and/or any combination of a full bin, auger motor breakdown, auger belt slippage, or the like. Even if the auger pulley is still revolving at a rate sufficient to permit link assembly 45 to be in its lowermost position, superstructure 30 will tilt, along with the structure to which auger 12 is journaled, sufficiently to tip mercury switch 19 back to an attitude with respect to the horizontal which will again interrupt the circuit.

When a control mechanism is associated with every auger on horizontal support member 17, track wheel 14 will not revolve so long as any mercury switch is in its tilted and interrupted attitude. Thus horizontal support arm 17 will not be in arcuate movement about the bin so long as any auger pulley is not revolving above a predetermined rate, or so long as the structure to which any auger is journaled is tipped at an angle far enough towards the direction of arcuate movement to again interrupt the circuit. Thus, it should be apparent that if the tipping forwardly of a structure to which any auger is journaled is caused by heavy, wet grain, all augers may continue revolving even though the horizontal support member 17 is stationary until the condition causing the excessive tilt forward is no longer present. As soon as that auger becomes adequately upright, current will again flow to motor 18 and horizontal support member 17 will automatically begin again to move arcuately about the grain bin.

Obviously numerous modifications and variations of the present invention are possible in light of the above teachings. It is therefore to be understood that within the scope of the appended claims, the invention may be practised otherwise than is specifically described therein.

I claim:

1. In a grain bin stirring apparatus having a radially extended horizontal down auger support member for arcuate movement about the bin center, a mechanism for controlling said movement, comprising:
   a mercury switch connected in series with the motor which supplies power for said arcuate movement;
   a carrier for fixedly holding said switch having a first end pivotally attached to the structure to which an auger is journaled and a second end extending over and past the center of the pulley of said auger;
   a weight slidably and radially mounted atop said pulley between its center and its periphery, its end adjacent the center of said pulley sloped to face upwardly;
   means connected to said weight for biasing it against centrifugal force when said pulley revolves; and
   a vertically oriented link having a lower end resting on said sloped end of said weight and an upper end supporting said carrier at an attitude with respect to the horizontal which will not allow current to flow through said motor unless said auger pulley revolves above a pre-determined rate, the vertical orientation of said link being maintained by means attached to said structure to which the auger is journaled for slidable support, whereby the current will be interrupted even though said pulley is revolving above said rate if the structure to which the auger is journaled, itself, is tipped beyond a predetermined angle.

2. The control mechanism as set forth in claim 1 further comprising an additional mercury switch for additional augers carried by said radially extended horizontal support member, each said additional switch connected in series with said first mercury switch and said motor, and having its own carrier, weight, biasing means, and link cooperating together therewith in the same manner as the parallel elements do with respect to said first mercury switch, whereby the current will be interrupted until all pulleys are revolving above said predetermined rate and whereby the current will be interrupted regardless of whether all pulleys are revolving above said rate if any auger supporting structure, itself, is tipped beyond a pre-determined angle.

3. The control mechanism as set forth in claim 1 or 2 further comprising:
   a second weight slidably and radially mounted atop said pulley(s) in diametrically opposite relation to said first weight with respect to the center of said pulley(s), having its end adjacent the center of said pulley(s) sloped to face upwardly; and wherein said biasing means is further characterized as including two tension springs, one connected between the ends of said weights distal said sloped ends along one side thereof and the other between the said ends distal said sloped ends along the other side thereof and said link is located coaxially with the auger pulley.

4. The control mechanism as set forth in claim 3 further comprising:
   an inverted shallow bullet-nose shaped cap coaxially mounted to the lower end of said link whereby the friction between said link and said sloped ends of said first and second weight is reduced.

5. The control mechanism as set forth in claim 1 or 2 wherein said mercury switch carrier(s) is further characterized as having a threaded hole distal its pivotal end and further comprising:
   a plate attached to said auger support means oriented parallel to the plane of said pulley(s) and located below said hole; and
   a thumb screw cooperatively threaded with and mounted in said hole whereby the minimum angle between said carrier(s) and said pulley(s) can be established.

6. The control mechanism as set forth in claim 3 further comprising:
   an inverted U-shaped strap whose vertical legs are fixedly attached to the structure to which the auger(s) is journaled and whose horizontal member is above the center(s) of said pulley(s) and has an aperture therein for vertical slidable support of said link; and
   a pair of spaced vertical plates mounted atop said horizontal member of said U-shaped strap at right angles thereto centered thereon and extending distal the auger pulley center(s), having opposingly located apertures in said extensions for receiving either end of an axle for pivotally mounting said carrier.

7. The control mechanism as set forth in claim 6 wherein said mercury switch carrier is further characterized as having its end distal its pivoted end extend beyond said strap and having in said extension a threaded hole, and further comprising:
   a thumbscrew cooperatively threaded with and mounted in said hole in said carrier; and
   a plate affixed to said strap beneath said threaded hole whereby the minimum angle between said carrier and said pulley(s) can be established.

8. The control mechanism as set forth in claim 3 further comprising:
   means affixed to said pulley(s) and centered thereon for constraining each weight to a limited horizontal, radial movement away from the pulley center(s); and
   an ear-shaped member fixedly attached to either side of each weight distal their sloped ends and extending outward of the constraining means for connecting the ends of each of said tension springs thereto.

* * * * *